US006963560B2

(12) United States Patent
Sawey et al.

(10) Patent No.: US 6,963,560 B2
(45) Date of Patent: Nov. 8, 2005

(54) METHOD AND SYSTEM FOR FRAME AND POINTER ALIGNMENT OF SONET DATA CHANNELS

(75) Inventors: David Sawey, Richardson, TX (US); Edmund Cher, Plano, TX (US)

(73) Assignee: Alcatel, Paris (FR)

( * ) Notice: Subject to any disclaimer, the term of this patent is extended or adjusted under 35 U.S.C. 154(b) by 930 days.

(21) Appl. No.: 09/966,588

(22) Filed: Sep. 28, 2001

(65) Prior Publication Data

US 2002/0118668 A1    Aug. 29, 2002

Related U.S. Application Data

(60) Provisional application No. 60/236,619, filed on Sep. 29, 2000.

(51) Int. Cl.[7] ............................................. H04L 12/66
(52) U.S. Cl. ..................................................... 370/353
(58) Field of Search ................................ 370/228, 535, 370/503–520, 389; 359/115, 152, 158–159, 359/180, 183–184

(56) References Cited

U.S. PATENT DOCUMENTS

| | | | | |
|---|---|---|---|---|
| 5,051,979 | A | * | 9/1991 | Chaudhuri et al. ......... 370/506 |
| 5,155,728 | A | | 10/1992 | Takeuchi et al. |
| 5,631,896 | A | * | 5/1997 | Kawase et al. ............. 370/228 |
| 6,246,668 | B1 | * | 6/2001 | Kusyk ........................ 370/228 |

OTHER PUBLICATIONS

European Search Report for 01440324.0-1237-Oct. 11, 2002.
Acharya, S.; Gupta, B.; Risbood, P.; Srivastava, A.; "Hitless network engineering of SONT rings"; Global Telecommunications Conference, 2003. GLOBECOM '03. IEEE vol. 5, pp.: 2735-2739; Dec. 1-5, 2003.*
Shrikhande, K.; Ikoma, Y.; Nakamura, A.; Kyeong Soo Kim; Horie, K.; Kazovky, L.G.; "Hitless wavelength add-drop using a novel signaling protocol combined with hitless switching techniques"; Optical Fiber Comm. Conference and Exhibit, 2002; pp. 740-742.*
Ohta, H.; Ueda, H.; "Hitless line protection method for ATM networks"; Communications, 1993. ICC 93. Geneva. Technical Program, Conference Record, IEEE International Conference on May 23-26, 1993; vol. 1, pp.: 272-276.*
Iselt, A.; "A new synchronization algorithm for hitless protection switching in ATM networks"; Performance, Computing and Communications Conference, 1999. IPCCC '99. IEEE International Feb. 10-12, 1999 pp.: 370-376.*

* cited by examiner

Primary Examiner—Chi Pham
Assistant Examiner—Thai Hoang
(74) Attorney, Agent, or Firm—Gray Cary Ware & Friedenrich; Jessica W. Smith; V. Lawrence Sewell (57) ABSTRACT

One embodiment of the system for processing digital signals includes a pointer follower ("PF") to receive a first digital signal. The first digital signal can have a first embedded payload, a first signal frame and a first PF pointer. The first pointer follower can extract the first embedded payload and forward the first embedded payload to an elastic buffer. The elastic buffer is operable to receive, delay and forward the first embedded payload. Additionally, a pointer generator ("PG") is operable to receive the first embedded payload from the elastic buffer, construct a new digital signal comprising a new signal frame, a PG pointer and the first embedded payload. The location of the new signal frame is determined by a synchronization pulse received from a synchronization module. In a further embodiment of the present invention, the delay imposed by the elastic buffer can depend upon the offset between the PG pointer and the PF pointer.

30 Claims, 5 Drawing Sheets

METHOD AND SYSTEM FOR FRAME AND POINTER ALIGNMENT OF SONET DATA CHANNELS

RELATED APPLICATIONS

This application claims priority under 35 U.S.C. §119(e) to U.S. patent application Ser. No. 60/236,619 entitled "Method and System for Frame and Pointer Alignment of Sonet Data Channels" by David Sawey and Edmund Cher filed Sep. 29, 2000, which is incorporated by reference as if set forth in its entirety herein.

TECHNICAL FIELD OF THE INVENTION

The present invention relates generally to telecommunications switching systems, and, more particularly, to a system and method for errorless switching between a working data channel and an alternate data channel carried over a diverse route within a SONET system.

BACKGROUND OF THE INVENTION

Switching of digital signals from a service (working) channel to an alternate (protect) channel, and vice versa, in a communications system can cause a ("hit") to the traffic. In other words, the payload can be corrupted during this switch from a working channel to the protect channel. This corruption can occur because the protect channel and the working channel may have data packet frames that are not aligned and/or they may have differing payload pointer values. A processor circuit must recognize the different pointer values and align its counter and/or recognize the misaligned frames and align the frames. During this time the traffic can be corrupted if a switch is initiated prior to frame and/or pointer aligning the two signals.

Hitless (i.e., errorless) switching systems (for example, for digital radio) are known. In these systems, signals carried on a working channel are switched to a protect channel upon the detection of a predetermined threshold number of errors at the receiver. These prior switching systems accomplish this switching by compensating for the different transmission delays between the working and protect channels by incorporating into each channel a delay build-out equal to the maximum differential delay between the two channels. Furthermore, an additional variable delay can be controllably added to the protect channel. By varying the length of this variable delay, a delay can be added to the protect channel such that the total delay of the protect channel is equal to the total delay of the working channel. The total delay of the working channel is equal to the inherent delay in the working channel plus the delay build-out. Once a delay between the channels has been equalized, the signal can be hitlessly switched from the working channel to the protect channel or vice-versa.

Such an errorless switching system, however, can only be used when the bitstream transported on the protect channel is identical to the bitstream transported on the working channel. Such a system cannot be used when employing a signal format (for example, the SONET format) in which a payload (i.e., a predetermined unit of data) and a marker indicating the location of the payload can float within each frame and where the bitstreams arriving at the receiver from the working and protect channels may not be identical. Furthermore, the overhead bytes of the signal carried on the working channel may be different than the overhead bytes of the signal carried on the protect channel, even if the starting location of the payload and corresponding frames is the same. Signals carried on a SONET network, for example, may be rerouted from the working channel to an alternate protect channel which may have passed through an intermediate central location. To keep the payload synchronous with the SONET network, the payload may be shifted within the SONET frame. The signals that arrive at the receiving end on the working and protect channels could thus possibly be different.

U.S. Pat. No. 5,051,979 claims to teach a method for achieving hitless switching between SONET signals. In this method, each STS-1 signal is frame aligned by an individual delay buffer and sent to an individual pointer processor. Inside the pointer processor, each signal's payload data is extracted and inserted into a new frame, along with a new pointer value. At the output of each pointer processor, the new pointer values are sent to a pointer justification and controller circuit. One of the pointer processors is designated the master and the other pointer processor is designated the slave. The pointer justification and controller circuit monitors the pointer value generated by the master pointer processor and, based on the master pointer value, sends justification control information to the slave pointer processor. Thus, at the output of the two pointer processors, the pointer values match. Subsequently, each signal is sent to a 2:1 multiplexer which selects between the two STS-1 channels. Because the signals are both frame and payload aligned, a simple 2:1 selection can cause a switch from the working channel to the protect channel and back.

While this method accomplishes hitless switching in switching systems employing a signal format such as the SONET format, the solution is complex and costly because frame alignment is accomplished by inserting a bulk delay on the entire STS frame of the ahead SONET signal. A given STS frame will thus become more and more delayed as it passes through the telecommunications system. As a result larger and larger buffers will be required to deal with the frame differences as the system expands.

SUMMARY OF THE INVENTION

Therefore, a need exists for an errorless (hitless) switching technique that provides both frame and pointer alignment of SONET data signals along differing data channels in a telecommunications network without the cost and complexity of previously developed hitless switching systems and methods.

A further need exists for a hitless switching technique that can align the SONET frames within the data signals carried along a SONET telecommunications system by pointer manipulation rather than by adding a bulk delay. Pointer manipulations are matched along the working and protect paths so that pointer alignment is maintained throughout the system, allowing hitless protection switching to be performed.

Still further, a need exists for a method and system for frame and pointer alignment of SONET data channels to perform hitless switching that requires a lesser amount of RAM for buffering than previous systems for providing frame and pointer alignment.

The present invention provides an improved method and system for frame and pointer aligning of SONET data channels for hitless switching between data channels that eliminates or reduces disadvantages and problems associated with previously developed hitless switching systems and methods used for switching between a working channel and an alternate protect channel within a SONET telecommunications system.

In particular, the present invention provides a system and method for processing digital signals. One embodiment of the system for processing digital signals includes a pointer follower ("PF") to receive a first digital signal. The first digital signal can have a first embedded payload, a first signal frame and a first PF pointer. The first pointer follower can extract the first embedded payload and forward the first embedded payload to an elastic buffer. The elastic buffer is operable to receive, delay and forward the first embedded payload. Additionally, a pointer generator ("PG") is operable to receive the first embedded payload from the elastic buffer, construct a new digital signal comprising a new signal frame, a PG pointer and the first embedded payload. The location of the new signal frame is determined by a synchronization pulse received from a synchronization module. In a further embodiment of the present invention, the delay imposed by the elastic buffer can depend upon the offset between the PG pointer and the PF pointer.

An important technical advantage of the errorless (hitless) switching technique of the present invention is that it can provide for both frame and pointer alignment of SONET data signals along differing data channels in a telecommunications network without the cost and complexity of previously developed hitless switching systems and methods.

Another technical advantage of the hitless switching technique of this invention is the capability to align the SONET frames within the data signals carried along a SONET telecommunications system by pointer manipulation, rather than by adding a bulk delay.

Yet another technical advantage of the method and system for frame and pointer alignment of SONET data channels of this invention is the capability to perform hitless switching using a smaller amount of RAM for buffering than previous systems for frame and pointer alignment of data signals.

BRIEF DESCRIPTION OF THE DRAWINGS

For a more complete understanding of the present invention and the advantages thereof, reference is now made to the following description taken in conjunction with the accompanying drawings in which like reference numerals indicate like features and wherein.

DETAILED DESCRIPTION OF THE INVENTION

Preferred embodiments of the present invention are illustrated in the Figures like numerals being used to refer to like and corresponding parts of the various drawings.

The present invention provides the capability for hitless switching between two digital signals. In a typical application, such as that shown in FIG. 1, a transmitting device 8 and a receiving device 11 can be separated over a long distance. Transmitting device 8 and receiving device 11 can be connected over this long distance by data channels 7. The interface between transmitting device 8 and receiving device 11 can be bi-directional and hence can work the same in either direction.

Figure 1:
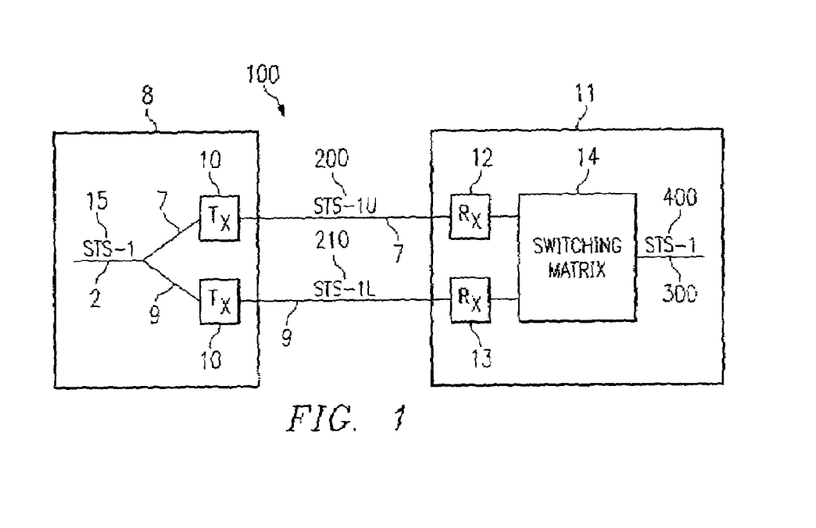
FIG. 1 shows a block diagram representation of a telecommunications system 100 in which the frame and pointer aligning pointer adder of the present invention can be incorporated.

FIG. 1 shows a block diagram of a telecommunications system 100 in which the frame and pointer aligning pointer adder of the present invention can be incorporated. Telecommunications system 100 can be an optical telecommunications system utilizing the SONET signal format. FIG. 1 shows input STS-1 signal 15 originating along input channel 2 in transmitting device 8, where it is split into upper STS-1U signal 200 and lower STS-1L signal 210 and forwarded to transmitters 10 along data channels 7 and 9, respectively. Transmitters 10, which can be identical transmitters, forward upper STS-1U signal 200 and lower STS-1L signal 210 to receivers 12 and 13 of receiving device 11 over data channels 7. The paths of the different data channels 7 can be different paths.

Receivers 12 and 13 each receive a copy of input STS-1 signal 15 (in the form of either upper STS-1U signal 200 or lower STS-1L signal 210). The signals can take different paths to reach their respective receiver 12 or 13. Receivers 12 and 13 can be identical receiving units. Receivers 12 and 13 forward their respective input signal to switching matrix 14, in which the hitless switching operation can be performed between working and protect copies of input STS-1 signal 15. Switching matrix 14 forwards as an output a reconstituted output STS-1 signal 400, which has an identical payload to input STS-1 signal 15, to the rest of telecommunications system 100 along output channel 300.

Upper STS-1U signal 200 and lower STS-1L signal 210 arrive at switching matrix 14 of FIG. 1 with identical payloads and with the same payload pointer values. However, the STS frames of the two signals may not be aligned. This is because each signal may have taken a different path through the telecommunications system 100 to arrive at switching matrix 14. Within switching matrix 14, upper STS-1U signal 200 and lower STS-1L signal 210 can each be further split into working and protect copies of each, and it may be desirable to select between working and protect copies without affecting their payload. Such a selection between a working copy and a protect copy of either upper STS-1U signal 200 or lower STS-1L signal 210, which does not corrupt the respective payloads, is referred to as a hitless switch. Note that upper STS-1U signal 200 and lower STS-1L signal 210 are described as upper and lower for descriptive purposes only and this description is not meant to denote any fixed orientation or origination of the respective signals.

Figure 2A:
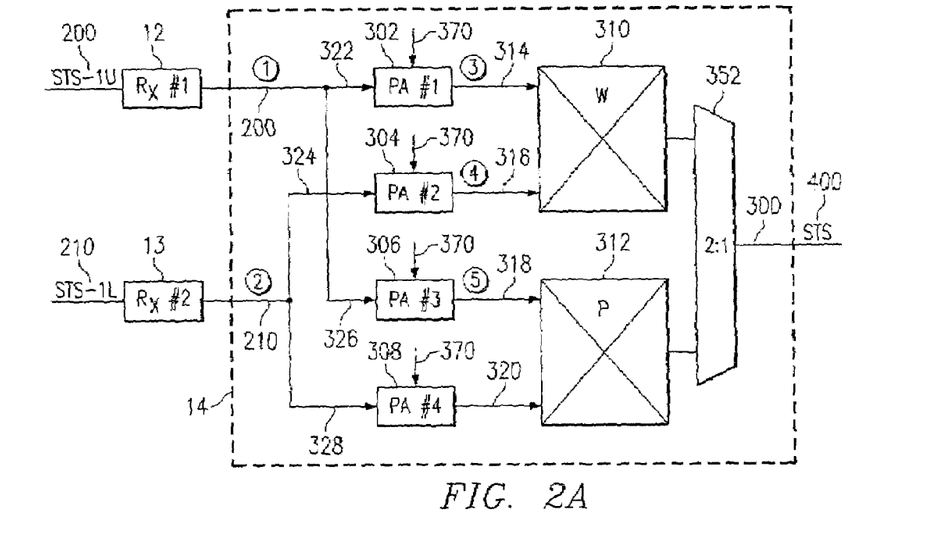
FIG. 2A shows a close up block diagram of one possible switching matrix 14 configuration incorporating an embodiment of the pointer adder of the present invention.

FIG. 2A shows a close up block diagram of one possible switching matrix 14 configuration incorporating an embodiment of the pointer adder of the present invention. Receivers 12 and 13 receive upper STS-1U signal 200 and lower STS-1L signal 210, respectively and forward the signal to switching matrix 14. Upper STS-1U signal 200 is split into two identical copies, one of which is forwarded along upper working channel 322 to pointer adder 302, and the other which is forwarded along upper protect channel 326 to pointer adder 306. Similarly, lower STS-1L signal 210 is split into two identical copies, one of which is forwarded to pointer adder 304 along lower working channel 324, and the other of which is forwarded to pointer adder 308 along lower protect channel 328.

The two copies of each of upper STS-1U signal 200 and lower STS-1L signal 210 are not necessarily frame aligned when received by their respective pointer adders. This is because each copy of each signal may have taken a different path in reaching its respective pointer adder. However, the present invention does assume that at some point prior to arriving at receivers 12 and 13, upper STS-1U signal 200 and lower STS-1L signal 210 were frame and pointer aligned (i.e., that any signals that at some point in switching matrix 14 might be interchanged have been frame and pointer aligned at some point prior to processing through a pointer adder).

In a typical digital signal processing network, a signal carrying a data payload is split into redundant paths (channels), as described above in connection with FIGS. 1 and 2A, to provide the capability of uninterrupted signal transmission if one of the channels is down for maintenance or due to a casualty. The capability to hitlessly switch between redundant paths, such as upper working channel 322 and upper protect channel 326, gives a network user the option to select between channels without loss or corruption of data. Maintenance on one or the other of a working channel or a protect channel will therefore not affect the user's ability to carry his traffic without interruption. Further redundancy is provided by splitting the original input signal, such as input STS-1 signal 15 of FIG. 1, into two or more copies that are then split into working and protect copies. This is the example described above as part of FIG. 2A. Furthermore, a hitless switching system and method, such as that of the present invention, can allow for switching between a working and a protect channel in a manner that is transparent to those receiving the information (payload) being carried on the telecommunications system 100.

Within a telecommunications system 100, such as a SONET system, it is often desirable to maintain STS frame alignment at various points within the system, even when the STS frames originate from different parts of the system. This frame alignment simplifies the framing and overhead processing required at each interface, such as that at the output of pointer adders 302, 304, 306 and 308 of FIG. 2A. In a typical SONET system, a frame synchronization signal is distributed to all circuits that originate an STS signal. Thus all STS frames are aligned at their origin. However, as the STS signals progress through the system, they can arrive through different paths to interfaces where frame alignment is desired. The phase difference between each STS signal is assumed to be fixed and known. To align the STS frames, each STS-1 signal, such as the copies of input STS-1 signal 15 above, is applied to a pointer adder circuit.

As will be described in more detail below, at the input of each pointer adder, such as pointer adders 302, 304, 306 and 308 of FIG. 2A, a pointer follower circuit extracts the embedded payload from the STS-1 signal frame and writes it into an elastic buffer. At the output of the elastic buffer, a pointer generator circuit reconstructs a new STS-1 frame by inserting a new pointer value based on the location of the embedded payload relative to the new STS frame. Over a sequence of frames, a feedback mechanism causes the new pointer value to adjust until the new pointer value is a fixed offset from the incoming pointer value. This is a one time operation, and subsequent pointer movements in the pointer follower are passed directly to the pointer generator and do not affect the frame alignment.

By sending a common frame synchronization signal to each pointer adder, the STS frames at the output of each pointer adder can be brought into alignment. Since the pointer manipulation in the pointer adder is predictable, working and protect copies of traffic passing through similar paths in the telecommunications system 100 will experience identical pointer changes. Thus, pointer alignment between working and protect copies can be maintained throughout the system, allowing hitless protection switching. Compared with the bulk delay approach of prior art systems, the amount of buffering required at each frame alignment point is very small and does not increase with telecommunications system 100 size.

Returning now to FIG. 2A, it is desirable that the signals entering each of working and protect crosspoint switches 310 and 312 be frame aligned with each other. Pointer adders 302, 304, 306 and 308 frame align their respective signals such that all copies of input STS-1 signal 15 are frame aligned at the input interface to working crosspoint switch 310 and protect crosspoint switch 312. Working and protect crosspoint switches 310 and 312 are used to select which working signal and which protect signal will be forwarded to the rest of telecommunications system 100. Working and protect crosspoint switches 310 and 312 can by synchronized with one another so that the working and protect signals associated with a given copy of input STS-1 signal 15 are forwarded together as a working signal and a protect signal.

Figure 2B:
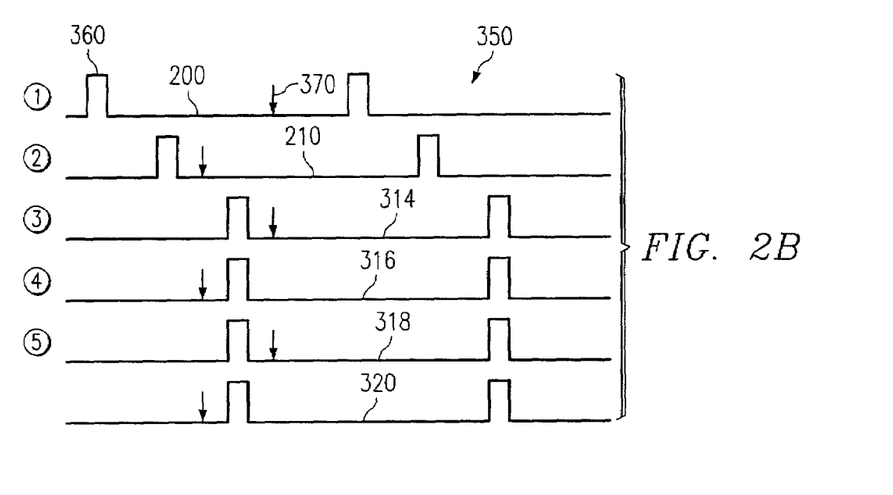
FIG. 2B shows signal graph 350 comprised of possible wave forms associated with various points in the system of one embodiment of this invention.

FIG. 2B shows signal graph 350 comprised of the wave forms for each of upper STS-1U signal 200, lower STS-1L signal 210, output STS-1UW working signal 314, output STS-1LW working signal 316, output STS-1UP protect signal 318 and output STS-1LP protect signal 320. These signals are, respectively, the two copies of input STS-1 signal 15 and the outputs from each of pointer adders 302, 304, 306 and 308.

As can be seen in FIG. 2B, upper STS-1U signal 200 and lower STS-1L signal 210 waveforms are shown (labeled accordingly) with their STS frames 360 out of alignment. Similarly, the start of their respective payloads, indicated by arrows 370, are also out of alignment. The distance between the start of each STS frame 360 and start of each payload 370 is measured and indicated by a SONET pointer. The waveforms shown in signal graph 350 are illustrative only and the actual waveforms generated by a system implementing the present invention could be different.

As is shown in FIG. 2B, at the output of pointer adders 302, 304, 306 and 308, output STS-1UW working signal 314 and output STS-1LW working signal 316, output STS-1UP protect signal 318 and output STS-1LP protect signal 320 are all frame aligned, as indicated by their respective STS frames 360. This frame alignment is performed in pointer adders 302, 304, 306 and 308 by keeping the payload of the respective incoming signals intact, but relocating the SONET frame 360 by changing the SONET pointer value. In the case shown in FIG. 2B, the pointer value was decreased for upper STS-1U signal 200 to generate output STS-1UW working signal 314. The pointer value of the output signal from pointer adder 302 is thus less than that for the signal at the input to pointer adder 302. Note that if necessary, the pointer value could have instead been increased to effect the desired frame alignment.

Figure 3:
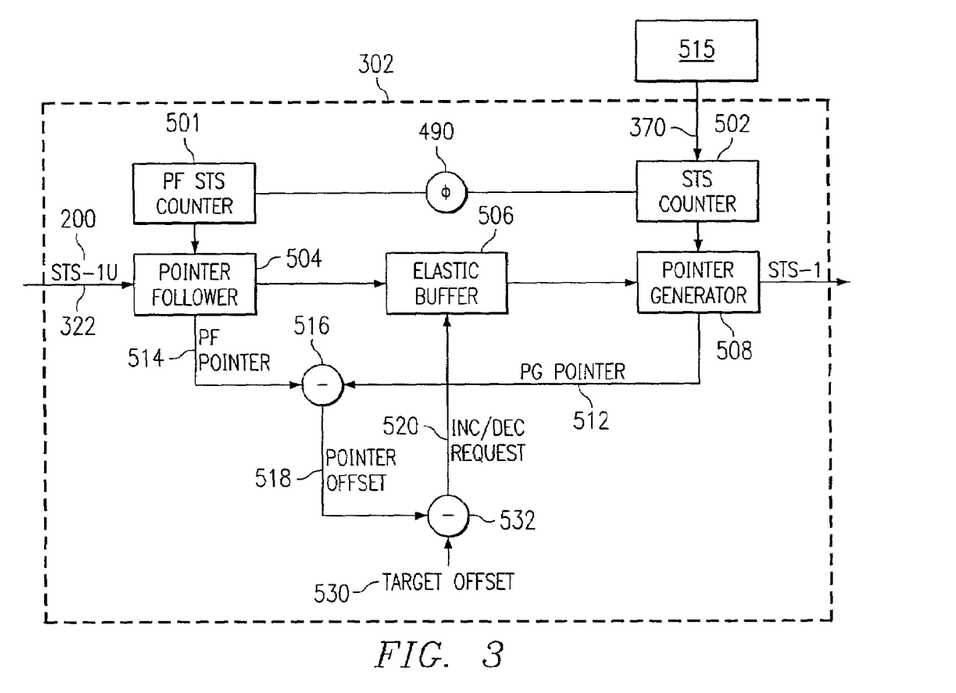
FIG. 3 is a simplified block diagram of a pointer adder according to the teachings of the present invention.

Pointer adders 302, 304, 306 and 308 thus ensure that the SONET frames of their respective input signals are aligned at their output, and hence at the input to an associated crosspoint switch (e.g., working crosspoint switch 310 or protect crosspoint switch 312). The change in pointer value for each signal is accomplished in pointer adders 302, 304, 306 and 308 by using a synchronizing pulse 370 as an input to each pointer adder's PG STS counter 502, as shown in FIG. 3. PG STS counters 502 determine the location of the SONET frame in the output signal from each pointer generator. Synchronizing pulse 370 ensures that each PG STS counter 502 is aligned with every other PG STS counter 502. This is enough to guarantee that the STS frame output from each of the pointer adders is aligned with every other STS frame. Synchronizing pulse 370 can be generated by a synchronization module 515 and is a system reference whose value can be arbitrarily determined and input to all pointer adders. By sending synchronization pulse 370 to all pointer adder PG STS counters 502, the signals output from each pointer adder will be frame aligned.

Synchronization module 515 generates the clocks and syncs for the entire system. The clock and sync pulses are sent to all circuit boards within transmission system 100. All the signals output from all pointer adders within transmission system 100 will thus be frame aligned to each other prior to being input to a crosspoint switch. Crosspoint switches, such as crosspoint switches 310 and 312, select working and protect signals to be forwarded, as previously discussed.

Although in the description of the embodiment of FIGS. 1 and 2A, upper STS-1U signal 200 and lower STS-1L signal 210 are copies of the same input STS-1 15 signal, alternative embodiments of this invention could instead have different input STS-1 signals into receivers 12 and 13. These distinct signals could then be processed by switching matrix 14 and routed through telecommunications system 100 by working and protect crosspoint switches independently of one another according to the teachings of this invention. In this way multiple STS-1 signals carrying different data can be routed through the same telecommunications system 100.

Pointer adders 302, 304, 306 and 308 also align the payloads of their respective input signals. The outputs from pointer adders 302, 304, 306 and 308 are thus not only frame aligned by synchronization pulse 370, but the working and protect copies of a particular input signal will also be payload aligned. This will allow for the hitless switching between working and protect signals which is the focus of the present invention. This is shown in signal graph 350 of FIG. 2B. As can be seen in FIG. 2B, output STS-1UW working signal 314 and output STS-1UP protect signal 318 (the working and protect copies of upper STS-1U signal 200, respectively) are both frame aligned and payload aligned, as indicated by payload indicators 370.

The pointer adder of the present invention accomplishes payload alignment of working and protect copies of a signal by ensuring that the incoming SONET pointer (payload pointer) sees the same adjustment in each pointer adder. For example, pointer adders 302, 304, 306 and 308 accomplish this by compensating for the different delays seen by the different copies of a signal as they travel different routes to reach their respective pointer adder. For example, if in FIG. 2B the value of the SONET pointer (the distance between the start of the SONET frame 360 and the payload indicator 370, which is an integer) for upper STS-1U signal 200 were 6, then to align the payloads at the outputs of pointer adders 302 and 306 (the working and protect copies of upper STS-1U signal 200), pointer adders 302 and 306 reduce the pointer value from 6 to, for example, 2. Pointer adders 302, 304, 306 and 308 can be pre-programmed to perform this adjustment.

Regardless of the path taken by each input signal, a system incorporating the pointer adders of this invention can be configured to ensure that the pointer changes are the same in each pointer adder processing the working and protect copies of a signal. This can be done because of the elastic buffers 506 that are used within each pointer adder. The elastic buffer 506 size (depth) of each pointer adder can be adjusted to ensure that the payload pointer value will see the necessary adjustment. Even if the incoming and outgoing SONET frames are not exactly where they are anticipated to be, each pointer adder can still be configured to ensure that the pointer value is adjusted appropriately. This is because a new pointer value will be generated for each signal as it exits its respective pointer adder, as will be explained in more detail below.

Figure 6:
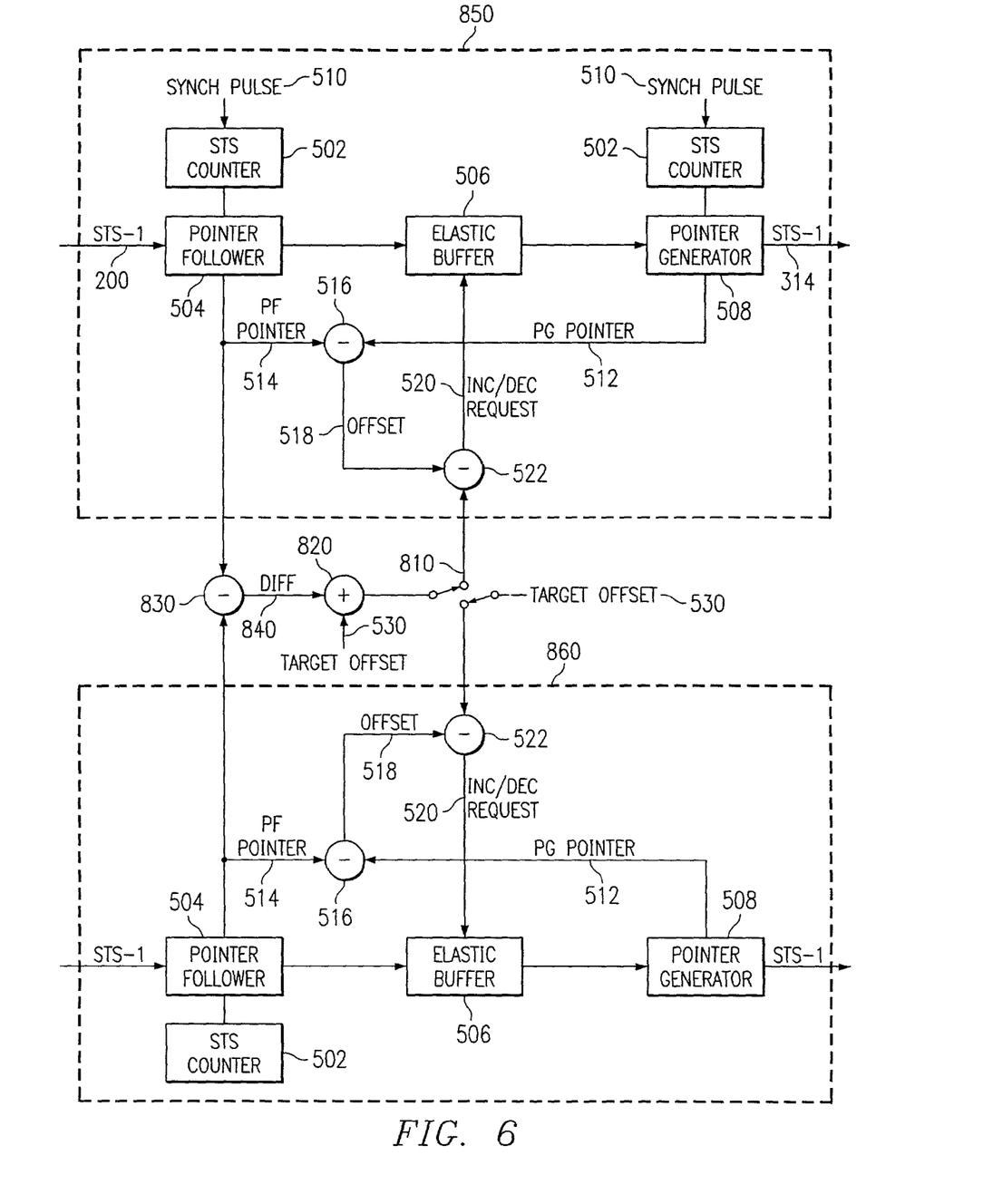
FIG. 6 is a simplified block diagram of another embodiment of the pointer adder method and system of the present invention.

Working crosspoint switch 310 and protect crosspoint switch 312 take as inputs, respectively, working and protect copies of upper and lower STS-1U and STS-1L signals 200 and 210. Working crosspoint switch 310 and protect crosspoint switch 312 select the set of working and protect signals to forward to 2:1 multiplexer 352 of FIG. 2A. Typically, both working crosspoint switch 310 and protect crosspoint switch 312 will select the same signal to forward to 2:1 multiplexer 352, either upper STS-1U signal 200 or lower STS-1L signal 210. In this way, 2:1 multiplexer 352 receives frame and pointer aligned copies of the same signal. When maintenance needs to be performed on working crosspoint switch 310 or protect crosspoint switch 312, 2:1 multiplexer 352 performs the actual selection (switching) between the two signals selected by working crosspoint switch 310 and protect crosspoint switch 312. Once a protection switch is initiated, 2:1 multiplexer 352 switches from the channel in which it was previously receiving payload data (either the working channel or the protect channel) to the other previously non-selected channel. 2:1 multiplexer 352 forwards the selected signal to the rest of telecommunications system 100 as reconstituted output STS-1 signal 400 along output channel 300. In addition, by introducing a simple feedback mechanism, frame and pointer alignment can be achieved between pointer adders 302 and 304 and between pointer adders 306 and 308. When frame and pointer alignment is achieved between pointer adders 302 and 304, working crosspoint switch 310 performs the actual selection (switching) between upper STS-1U signal 200 and lower STS-1L signal 210. Similarly, when frame and pointer alignment is achieved between pointer adders 306 and 308, protect crosspoint switch 312 performs the actual selection (switching) between upper STS-1U signal 200 and lower STS-1L signal 210. This type of protection switch is useful when maintenance needs to be performed on receiver 12 or receiver 13. FIG. 6 is a simple block diagram showing how pointer adders 302 and 304 can be interconnected with a simple feedback mechanism to achieve frame and pointer alignment between upper STS-1U signal 200 and lower STS-1L signal 210, which may not have been previously pointer aligned.

FIG. 3 is a simplified block diagram of a pointer adder according to the teachings of the present invention. Although pointer adder 302 is shown in FIG. 3, the following description applies equally to any pointer adder according to the teachings of this invention. An incoming STS-1 signal (here upper STS-1U signal 200) is input to pointer adder 302 along upper working channel 322. Upper STS-1U signal 200 is received by pointer follower 504. Pointer follower 504 extracts the embedded payload from the STS-1 frame and writes it into elastic buffer 506. At the output of elastic buffer 506, a pointer generator 508 reconstructs the STS-1 signal according to the location of the payload frame.

Pointer adder 302 employs a feedback mechanism whereby the pointer follower ("PF") and pointer generator ("PG") pointers 512 and 514 are compared, at comparator 516, to determine their offset. The resulting pointer offset 518 is compared to a target offset 530 at comparator 532. The difference between pointer offset 518 and target offset 522 is used to generate an increment/decrement request signal 520, which is input to elastic buffer 506 to, over time, adjust the PG pointer 512 so that the pointer offset 518 is brought into agreement with the target offset 530. Pointer adder 302 also includes PG STS counter 502, which receives synchronization pulse 370, and PF STS counter 501, which tracks the location of the STS frame of the incoming signal.

Pointer follower 504 extracts and interprets the STS pointer located within upper STS-1U signal 200. Using the pointer information, the payload can be extracted from the STS frame and written into the RAM of elastic buffer 506. At the output of elastic buffer 506 the pointer generator reconstructs a new STS frame with a pointer determined by the delay through the RAM and the relative offset between PF STS counter 501 and PG STS counter 502. The new pointer value can be determined by the modulo equation:

$$PG\_PNTR = PF\_PNTR + STS\_OFFSET + DEPTH \quad \text{(EQUATION 1)}$$

PG_PNTR is the PG pointer value, PF_PNTR is the PF pointer value, STS_OFFSET is the difference between the values of PF and PG STS counters 501 and 502, and the depth is the delay inserted by elastic buffer 506. STS_OFFSET, as measured by the difference between the values of PF and PG STS counters 501 and 502, has to be adjusted before it can be used in EQUATION 1 (and in subsequent equations herein). The reason is that, due to the presence of overhead bytes in the SONET frame, the range for STS_OFFSET is different than the range for PG_PNTR and PF_PNTR. Since STS_OFFSET can be in the range 0 to 809 and PG_PNTR and PF_PNTR can be in the range 0 to 782, the measured STS_OFFSET has to be normalized before it can be used in Equation 1. The way to normalize the measured STS_OFFET is to multiply the measured value by 783/810 and then round to the nearest integer.

On the pointer generator 508 side, PG STS counter 502 is synchronized by synchronization pulse 370 and determines the frame alignment for the outbound data. By sending the same SW synchronization pulse 370 to all pointer adders within telecommunications system 100, all of the STS frames can be aligned within the system, regardless of the frame orientation of the SONET signals entering each pointer adder.

Within telecommunications system 100, the exact relationship between the PF STS counter 501 and the PG STS counter 502 cannot be known in advance, because it depends on the exact cable length, PCB trace lengths, and process and temperature points within a particular installation. However, by placing mild restrictions on such factors as cable length, the range of anticipated offsets can be determined. Using this information pointer adder 302 (or 304 or 306 or 308) can be programmed to deliver a fixed offset between the PF pointer 514 and PG pointer 512, regardless of the exact nature of the STS counter offset. This offset is given by the equation PNTR_OFFSET = PG_PNTR − PF_PNTR. STS counter offset is measured at STS offset counter 490.

Substituting into Equation 1 above, the following equation is obtained:

$$PNTR\_OFFSET = STS\_OFFSET + DEPTH \quad \text{(EQUATION 2)}$$

By adjusting the elastic buffer depth in response to variations in the STS offset, pointer adder 302 is able to maintain a fixed pointer offset equal to target offset 530. The advantage of a fixed pointer offset is that an STS-1 signal duplicated across working and protect paths can be assured of undergoing the same pointer transformations along each path. Hence, a hitless switch between working and protect paths is possible at the signal destination.

To avoid a data spill in the RAM of elastic buffer 506, a reasonable pointer offset range must be determined in advance for each particular application. The allowable pointer offset depends on the range of STS offsets expected for the application, as well as on the acceptable range of elastic buffer 506 depth that can be allocated to the pointer adder 302 function. To maintain a safe level in elastic buffer 506, the pointer offset must be selected to satisfy the following Equations 3 and 4.

$$PNTR\_OFFSET - STS\_OFFSET_{MAX} > DEPTH_{MIN} \quad \text{(EQUATION 3)}$$

$$PNTR\_OFFSET - STS\_OFFSET_{min} < DEPTH_{MAX} \quad \text{(EQUATION 4)}$$

The STS offset (which is equal to the difference between PG STS counter 502 and PF STS counter 501) is a number indicating the magnitude of the difference between the two STS counters. Target offset 530 can be determined from the values for STS offset and elastic buffer 506 depth. Depending on where in the telecommunications system 100 the signal is, each pointer adder must be able to absorb a certain range of STS offset to function. This range is set by the system requirements and programmed into the system such that the STS offset will be within the programmed range under all conditions. For example, the range could be set between values of 5 and 10. As long as the difference between PF STS counter 501 and PG STS counter 502 is within the allowable range, the pointer adders of the present invention can perform their function. PG STS counter 502 and PF STS counter 501 track the location of the STS frame within the SONET signals.

The DEPTH term of equations 1–4 is the RAM size of elastic buffer 506. For example, the RAM size might have a value of 20 (in whatever units of memory are being used), and the application incorporating the present invention may require that depth be maintained between values of 3 and 16 at all times, based on the RAM size of 20. Using Equations 1–4 with these values, the allowable offset range can be determined using the following Equations 5 and 6.

$$PNTR\_OFFSET_{MIN} > DEPTH_{MIN} + STS\_OFFSET_{MAX} \quad \text{(EQUATION 5)}$$

$$PNTR\_OFFSET_{MAX} < DEPTH_{MAX} + STS\_OFFSET_{MIN} \quad \text{(EQUATION 6)}$$

For this example, the minimum pointer offset value is thus greater than 13, and the maximum pointer offset is less than 21. The pointer offset range for this example is thus between 13 and 21. RAM depth thus must be chosen such that it is greater than any STS offset that might occur. Pointer adder 302 (and any other pointer adders within telecommunications system 100) can then be programmed with an appropriate target offset 530. The function of the target offset 530 is to provide a protection so that the elastic buffer 506 does not overflow. Because both the working and protect channels will be using the same target offset 530, PG pointers 512 for each will experience the same pointer manipulations.

If two pointer adders are compared, for example, pointer adder 302 and pointer adder 306 (carrying the working and protect copies of upper STS-1U signal 200, respectively), the working and protect copies may have each traversed a different route before reaching their respective pointer adder. A signal taking the longer route could experience delay due to the additional distance traveled. This could result in a change in the location of the STS frame within the SONET signal traversing the longer path relative to the other signal. This can occur because the working and protect copies of the signal arrive at different times at their respective pointer follower 504. The PF pointer values 514 of each signal, however, are not affected by the different distances traversed through telecommunications system 100.

The signals arriving at two different pointer adders could thus have different STS frame locations because of the different distances traveled. STS frame location is tracked by PF STS counters 501. The method and system of this invention assumes that working and protect copies of signals traveling through telecommunications system 100 have been frame and pointer aligned at some point prior to arriving at pointer adders 302, 304, 306, or 308, or any other pointer adder. The signals arriving at the two different pointer adders have their payloads extracted by their respective pointer follower 504, as discussed above, and their payload sent to elastic buffer 506. The two signal's payloads are then delayed by appropriate amounts such that when the payloads are sent to their respective pointer generator 508, the two payloads are aligned. The STS frame location at the pointer generator 508 side of pointer adder 302 remains fixed at the value determined from synchronization pulse 370. However, the PG pointer 512 value at pointer generator 508 will have an initial value determined by the beginning of the STS frame at pointer generator 508 relative to the beginning of the payload frame at the output of elastic buffer 506.

The initial PG pointer 512 value at pointer generator 508 is determined by (is equal to) the PF pointer value 514 plus the STS offset, plus the delay through the elastic buffer 506. PG pointer value 512 and PF pointer value 514 will thus differ by some amount. When compared at comparator 516, this difference will be computed and output as pointer offset 518. Pointer offset 518 is then compared to target offset 530 at comparator 522. A nonzero difference between target offset 530 and pointer offset 518 will generate an increment/decrement request signal 520 that is then forwarded to elastic buffer 506 to cause an advance or delay in the payload frame, with respect to the STS SONET frame, of one location. What this means is that the PG pointer value 512 is moved by one increment either up or down depending on increment/decrement request 520. This feedback mechanism continues until the difference between actual pointer offset 518 and target offset 530 is zero (pointer offset 518 is equal to target offset 530). The STS frame at the pointer generator 508 side is fixed due to synchronization pulse 370, which results in moving the payload start relative to the STS frame with increment/decrement request signal 520. The effect is a corresponding increase or decrease in the value of PG pointer 512.

Because PF pointer 514 is the same for all signals, inserting an identical target offset 530 at all pointer adders results in all PG pointer values 512 being equal (aligned) at all pointer adders within telecommunications system 100. This is true if all signals traveling through switching matrix 14 have been pointer aligned and frame aligned at some point prior to their processing by the pointer adders of this invention. If the start of the STS frame remained aligned at the input of pointer adder 302 and the output of pointer adder 302, then the target offset necessary to accomplish pointer alignment would be zero (assuming zero delay in elastic buffer 506), because the PG pointer 512 value would be equal to the PF pointer value 514 plus the offset, which is equal to zero. However, due to differences in the locations of the STS frame of different copies of a signal caused by path differences, some non-zero target offset 530 is typically required.

The modulo system of numbering for SONET format signals requires that a pointer value can only be between zero and 782 (i.e., the offset between the STS frame and the start of the signal payload can only be a value between zero and 782). Beyond 782, however, the numbering system begins again with 0. A pointer value of 782 could thus be thought of as either 782 or −1. As can be seen from the description given above, insertion of a set target offset 530 at each pointer adder throughout telecommunications system 100 will result in the value of PG pointer value 512 increasing at each subsequent pointer adder. As telecommunications system 100 grows, PG pointer's 512 value will get larger and larger as a signal goes through the system. However, due to the modulo system, PG pointer 512's value will increase to no more than 783, and then the numbering will start again.

The method and system of this invention avoid or significantly reduce the disadvantages of prior art systems and methods that do not use the feedback mechanism described above. Prior art systems insert a bulk delay, using similar buffers to elastic buffer 506, in which both the payload and the STS frames and overheads of the SONET signal are buffered at each interface within transmission system 100. These bulk delays are cumulative, resulting in a continuous increase in buffer memory requirements as transmission system 100 grows. For a very large transmission system, the elastic buffer requirements will eventually become prohibitive. The pointer adders of the method and system of this invention do not require interconnection (i.e., communication between pointer adders) to maintain pointer and frame alignment. This is a key advantage of the present invention. However, matched signals processed through transmission system 100 will need to pass through an equivalent number of pointer adders to maintain pointer and frame alignment at their ultimate destination.

The elastic buffer 506 depth can be changed based on increment/decrement request signal 520. The change in buffer 506 depth causes the value of PG pointer 512 to change (i.e., the offset between the STS frame and the payload start location changes) because the STS frame start location remains fixed at the pointer generator 508 side, while the payload is delayed at elastic buffer 506. The initial PG pointer 512 value is determined from the PG STS frame start location (set by synchronization pulse 370) and the start of the payload as it exits elastic buffer 506.

Figure 4:
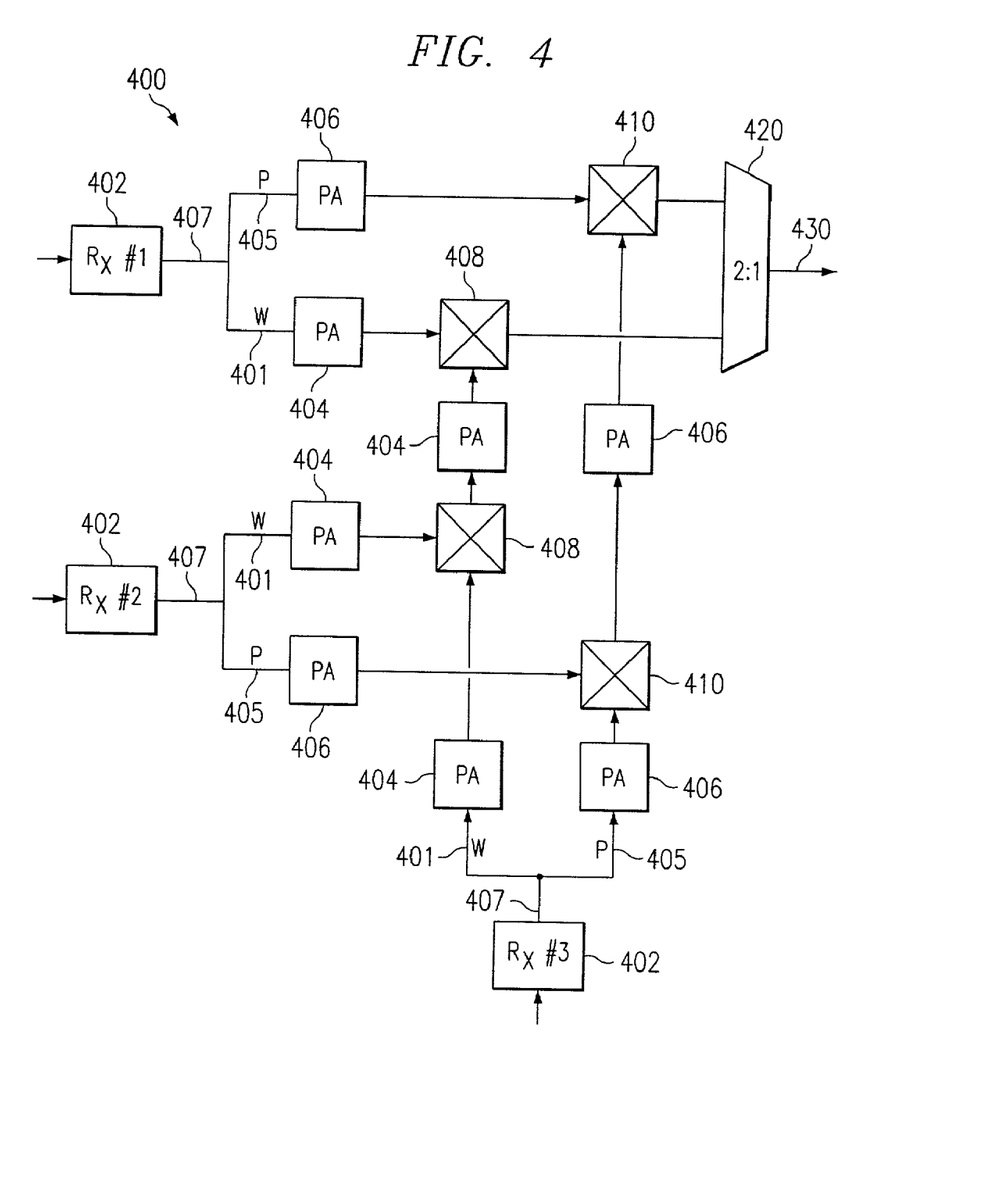
FIG. 4 is a simplified block diagram of another switching matrix configuration illustrating the scalable nature of the pointer adder method and system of the present invention.

FIG. 4 is a simplified block diagram of another switching matrix configuration, switching matrix 400, illustrating the scalable nature of the pointer adder method and system of the present invention. Switching matrix 400 includes three receivers 402, each of which outputs a signal 407 that is split onto working and protect paths 401 and 405. The working and protect copies of each signal 407 are input into pointer adders 404 and 406, respectively, for each such signal 407. Working and protect copies of each signal 407, after being processed by their respective pointer adder, are then sent to a working crosspoint switch 408, or to a protect crosspoint switch 410, respectively. As previously described, working and protect crosspoint switches 408 and 410 select a working or protect signal to pass along to the rest of transmission system 100.

Eventually, selected working and protect copies of one of the signals 407 are forwarded to 2:1 multiplexer 420, where a hitless switch can be performed and a selected signal output as output STS-1 signal 430. FIG. 4 illustrates how the scalability of the present invention allows it to be used in larger and more complex transmission systems 100, as required. Switching matrix 400 of FIG. 4 could include many more receivers 402 and corresponding pointer adders 404, 406 and crosspoint switches 408 and 410, depending on the particular application.

Figure 5:
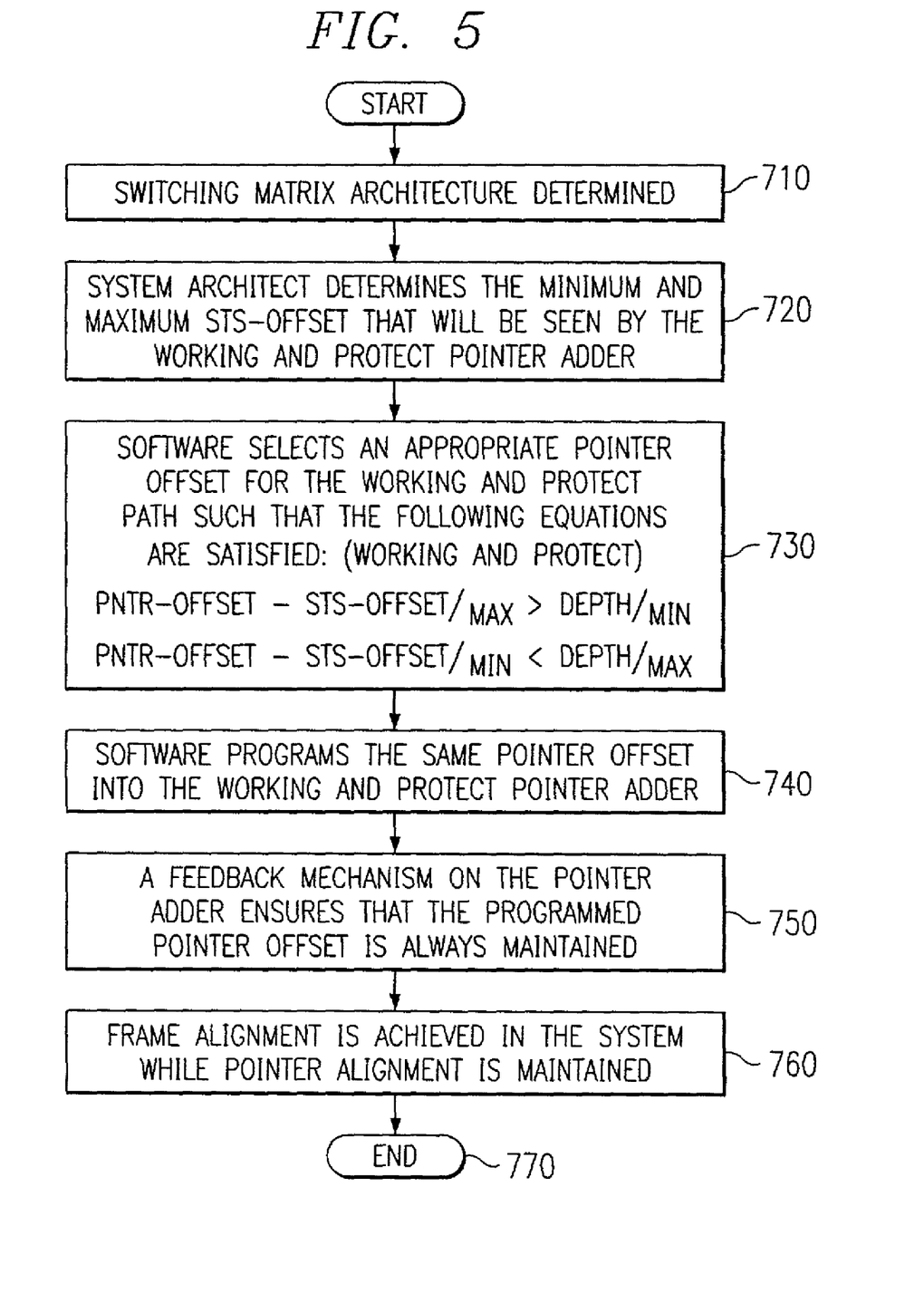
FIG. 5 is a flow chart of one embodiment of the operational steps of the method according to the teaching of the present invention.

FIG. 5 is a flowchart diagraming the overall operation of one embodiment of the method of the present invention. At step 710, the method starts by establishing the switching matrix configuration. At step 720, a system architect determines the minimum and maximum STS offset that might be seen by the working and protect pointer adders of, for example, switching matrix 14 of transmission system 100. The software controlling the operation of the switching matrix 14 is programmed appropriately. At step 730, the method software selects an appropriate pointer offset for the working and protect paths such that Equations 3 and 4 from above are satisfied for both the working and protect channels. At step 740, the software programs the same pointer offset into both the working and protect pointer adders. At step 750, a feedback mechanism in the pointer adder ensures that the programmed pointer offset is maintained. At step 760, frame alignment is achieved in the system according to the teachings of the present invention while pointer alignment is maintained. At step 770, the method ends.

FIG. 6 is a simplified block diagram of another embodiment of the pointer adder method and system of the present invention. The embodiment shown in FIG. 6 illustrates how the pointer adder of the present invention can be configured to perform pointer alignment between a pair of STS-1 signals that have not previously been pointer aligned. The embodiment of FIG. 6 compares the two STS-1 signals to one another and inserts an appropriate amount of delay to provide pointer alignment.

The system shown in FIG. 6 incorporates two pointer adders according to the teachings of this invention and previously described in relation to FIG. 3. The operation of each individual pointer adder is substantially the same and the description of FIG. 6 pointer adders are likewise substantially the same as for FIG. 3. In the embodiment of FIG. 6, two pointer adders 850 and 860 each receive an STS-1 signal, for example, working and protect copies of upper STS-1U signal 200. The goal of the embodiment of FIG. 6 is to buffer the payload of each STS-1 signal so that at the output of each pointer adder, the two STS-1 signals are pointer aligned and frame aligned. To achieve this goal, the PF pointers 514 from each pointer adder are compared to determine, first, which STS-1 payload is ahead and which is behind, and, second, by how much.

PF pointers 514 from each pointer adder are compared at comparator 830 and the pointer difference 840 is forwarded to comparator 820. Pointer difference 840 is added to the target offset 530 of the pointer adder having the ahead STS-1 signal to generate combined offset 810. Combined offset 810 is used to increase the latency of the ahead payload within its respective elastic buffer 506.

Combined offset 810 is forwarded to comparator 522 of the pointer adder having the ahead STS-1 signal, where it is compared to the pointer offset 518 of that pointer adder to generate an increment/decrement request signal 520, as previously discussed. Combined offset 810 can be forwarded to either pointer adder 850 or 860, as determined from the comparison of their respective PF pointers 514. The increased latency for the ahead signal is just enough to compensate for the skew between the ahead and behind payloads, so that the payloads for the two signals will be aligned at the output of their respective elastic buffers 506. In other words, the pointer difference 840 added to the target offset 530 for the ahead pointer adder is just enough to bring the two PG pointers 512 into alignment.

FIG. 6 shows the case where the STS-1 payload input to pointer adder 850 is ahead. If the STS-1 payload of pointer adder 860 was instead ahead, then the pointer adder 850 elastic buffer 506 would receive the target offset and the pointer adder 860 elastic buffer 506 would receive the combined offset 810. Further, in the configuration shown in FIG. 6, the elastic buffer 506 has to provide an amount of delay equal to the maximum possible offset between the payload locations in each of the two STS-1 signals. The RAM in the elastic buffer 506 should be sized to accommodate this maximum offset. The operation of the circuit is otherwise as described for FIG. 3.

While the present invention has been described from the point of view of matched pairs of working and protect channels, it is understood that the channels are interchangeable. Similarly, working and protect signals have been described in terms of a single STS (SONET) frame which is operated on by the pointer adders of the present invention. However, each such signal can be comprised of a series of frames and corresponding series of payloads and payload indicators (pointer indicators) transported on a given channel. The present invention has been described in terms of the SONET signal format, but the present invention is also applicable to other signal formats having similar characteristics in telecommunications systems requiring hitless switching between alternate channels. For example, the present invention can be used with any signal format in which there is a payload floating with respect to the signal frame.

In summary, the present invention provides a method and system for frame and pointer aligning of SONET data channels that allows for hitless switching between a first digital signal in which a first payload, payload indicator and a first overhead are transported on the first channel and a second digital signal in which a second payload identical to the first payload, a second payload indicator and a second overhead are transported on a second channel. The method and system of the present invention significantly reduce or eliminate disadvantages and problems associated with previously developed methods and systems for hitlessly switching between two channels in a telecommunications system.

Although the present invention has been described in detail herein with reference to the illustrative embodiments, it should be understood that the description is by way of example only and is not to be construed in a limiting sense. It is to be further understood, therefore, that numerous changes in the details of the embodiments of this invention and additional embodiments of this invention will be apparent to and may be made by, persons of ordinary skill in the art having reference to this description. It is contemplated that all such changes and additional embodiments are within the spirit and true scope of this invention as claimed below.

What is claimed is:

1. A system for processing digital signals, comprising:
a pointer follower to receive a first digital signal having a first signal frame, first embedded payload and a pointer follower ("PF") pointer, extract said first embedded payload from said first digital signal and forward said first embedded payload;

an elastic buffer in electrical connection with said pointer follower operable to receive, delay and forward said first embedded payload;

a pointer generator to receive said first embedded payload and a synchronization pulse and construct a new digital signal comprising said first embedded payload, a new signal frame, and a pointer generator ("PG") pointer, wherein the location of said new signal frame within said new digital signal is determined according to said synchronization pulse; and a synchronization module to generate said synchronization pulse according to a predetermined schedule and communicate said synchronization pulse to said pointer generator;

a first comparator operable to compare the value of said PF pointer and the value of said PG pointer and generate a pointer offset signal; and a second comparator operable compare said pointer offset signal a target offset signal, generate an increment/decrement request signal based on the comparison, and communicate the increment/decrement request signal to said elastic buffer; and wherein said elastic buffer delays said embedded payload according to said increment/decrement signal;

a PG counter synchronized according to said synchronization pulse;

a PF counter to track the location of said signal frame of said first digital signal; and a third comparator to measure the offset between said PG counter and said PF counter.

2. The system of claim 1, wherein the value of said PG pointer is determined by the offset between said PG counter and said PF counter, the value of said PF pointer, and the delay imposed by said elastic buffer.

3. The system of claim 1, wherein said first digital signal has a SONET signal format.

4. The system of claim 1, wherein said first digital signal is a packet based signal.

5. A system for processing digital signals comprising:
a first adder circuit comprising:
a first pointer follower to receive a first digital signal having a first signal frame, a first embedded payload and a first pointer follower ("PF") pointer, extract said first embedded payload from said first digital signal and forward said first embedded payload;

a first elastic buffer in electrical connection with said first pointer follower operable to receive, delay and forward said first embedded payload;

a first pointer generator to receive said first embedded payload and a synchronization pulse and construct a first new digital signal comprising said first embedded payload, a first new signal frame and a first pointer generator ("PG") pointer, wherein the location of said first new signal frame in said first new digital signal is determined according to said synchronization pulse; and a second adder circuit comprising:
a second pointer follower to receive a second digital signal having a second signal frame, a second embedded payload and a second pointer follower pointer ("PF pointer"), extract said second embedded payload from said second digital signal and forward said second embedded payload;

a second elastic buffer in electrical connection with said second pointer follower operable to receive, delay and forward said second embedded payload; and a second pointer generator to receive said second embedded payload and construct a second new digital signal comprising said second embedded payload, a second new signal frame and a second PG pointer, wherein the location of said second new signal frame within said second new digital signal is determined by said synchronization pulse and wherein said second new signal frame is aligned with said first new signal frame; and a synchronization module to generate said synchronization pulse according to a predefined schedule and operable to communicate said synchronization pulse to said first adder circuit and to said second adder circuit.

6. The system of claim 5, wherein said first digital signal and said second digital signal are a working copy and a protection copy, respectively, of the same digital signal.

7. The system of claim 6, wherein said first digital signal and said second digital signal are in a packet based format.

8. The system of claim 5, wherein:
said first adder circuit further comprises:
a first pointer comparator to compare the value of said first PG pointer to the value of said first PF pointer and generate a first pointer offset signal based on the comparison; and a first offset comparator to compare said first pointer offset signal to a first target offset signal, generate a first increment/decrement request signal, and communicate said first increment/decrement signal to said first elastic buffer, wherein said first elastic buffer is operable to delay said first embedded payload based on said first increment/decrement request signal; and said second adder circuit further comprises:
a second pointer comparator to compare the value of said second PG pointer to the value of said second PF pointer and generate a second pointer offset signal based on the comparison; and a second offset comparator to compare said second pointer offset signal to a second target offset signal, generate a second increment/decrement request signal, and communicate said second increment/decrement request signal to said second elastic buffer, wherein said second elastic buffer is operable to delay said second embedded payload based on said second increment/decrement signal; and wherein said first elastic buffer and said second elastic buffer forward said first embedded payload and said second embedded payload, respectively, in payload alignment.

9. The system of claim 8 wherein:
said first adder circuit further comprises:
a first pointer generator counter ("PG counter") synchronized according to said synchronization pulse;

a first pointer follower counter ("PF counter") to track the location of said first signal frame of said first digital signal; and a first counter comparator to measure the offset between said PG counter and said PF counter; and said second adder circuit further comprises:
a second PG counter synchronized according to said synchronization pulse; and a second PF counter to track the location of said second signal frame of said second digital signal; and a second counter comparator to measure the offset between said second PG counter and said second PF counter.

10. The system of claim 9 wherein said first target offset signal and said second target offset signal represent equal target offsets.

11. The system of claim 9, wherein:
the value of said first PG pointer is determined by the value of said first PF pointer, the offset between said first PG pointer counter and said first PF pointer counter and the delay imposed by said first elastic buffer; and
wherein the value of said second PG pointer is determined by the value of said second PF pointer, the offset between said second PG pointer counter and said second PF pointer counter and the delay imposed by said second elastic buffer.

12. The system of claim 8, wherein the value of said first PG pointer and the value of said second PG pointer are equal.

13. The system of claim 8, wherein said first new digital signal and said second new digital signal are in frame alignment and payload alignment.

14. The system of claim 8, wherein said first digital signal and said second digital signal are a working copy and a protection copy, respectively, of the same digital signal.

15. The system of claim 8, wherein said first digital signal and said second digital signal are in a packet based format.

16. The system of claim 8, further comprising:
a PF comparator operable to compare said first PF pointer to said second PF pointer and generate a PF difference signal; and
an adder operable to add the PF difference signal to a base target offset signal to derive said first target offset signal; and
wherein said first offset comparator is operable to compare said first offset signal to said first pointer offset signal to derive said first increment/decrement request signal.

17. A method for processing digital signals comprising:
receiving a first digital signal at a first pointer follower ("PF"), having a first signal frame, a first embedded payload and a first PF pointer;
extracting said first embedded payload from said first digital signal;
forwarding said first embedded payload;
delaying said first embedded payload at a first elastic buffer and forwarding said first embedded payload to first pointer generator;
constructing a first new digital signal comprising said first embedded payload, a first new signal frame and a first pointer generator ("PG") pointer at said first pointer generator, wherein the location of said first new signal frame within said first new digital signal is determined according to a synchronization pulse; and
receiving a second digital signal at a second pointer follower having a second signal frame, a second embedded payload and a second PF pointer, extracting said second embedded payload from said second digital signal;
forwarding said second embedded payload;
delaying said second embedded payload at a second elastic buffer and forwarding said second embedded payload to a second pointer generator; and
constructing a second new digital signal comprising said second embedded payload, a second new signal frame and a second PG pointer at said second pointer generator, wherein the location of said second new signal frame is determined according to said synchronization pulse; and
generating said synchronization pulse according to a predefined schedule and communicating said synchronization pulse to said first pointer generator and said second pointer generator.

18. The method of claim 17, wherein said first digital signal and said second digital signal are a working copy and a protection copy, respectively, of the same digital signal.

19. The method of claim 18, wherein said first digital signal and said second digital signal are in a packet based format.

20. The method of claim 17, further comprising:
comparing the value of said first PG pointer to the value of said first PF pointer at a first pointer comparator and generating a first pointer offset signal based on the comparison;
comparing said first pointer offset signal to a first target offset signal at a first offset comparator;
generating a first increment/decrement request signal at said first offset comparator based on the comparison between said first pointer offset signal and said first target offset signal;
communicating said increment/decrement request signal to said first elastic buffer, wherein said first elastic buffer is operable to delay said first embedded payload based on said first increment/decrement request signal; and
comparing the value of said second PG pointer to the value of said second PF pointer at a second pointer comparator and generating a second pointer offset signal based on the comparison; and
comparing said second pointer offset signal to a second target offset signal at a second offset comparator, generating a second increment/decrement request signal, and communicating said increment/decrement request signal to said second elastic buffer, wherein said second elastic buffer is operable to delay said second embedded payload based on said second increment/decrement request signal; and
forwarding said first embedded payload and said second embedded payload in payload alignment.

21. The method of claim 20 further comprising
determining a first counter offset between a first PG counter and a first PF counter at a first counter comparator; and
determining a second counter offset between a second PG counter and a second PF counter at a second counter comparator.

22. The method of claim 21 wherein said first target offset and said second target offset represent equal target offsets.

23. The method of claim 21, wherein:
the value of said first PG pointer is determined by the value of said first PF pointer, the offset between said first PG pointer counter and said first PF pointer counter and the delay imposed by said first elastic buffer; and
wherein the value of said second PG pointer is determined by the value of said second PF pointer, the offset between said second PG pointer counter and said second PF pointer counter and the delay imposed by said second elastic buffer.

24. The method of claim 20, wherein the value of said first PG pointer and the value of said second PG pointer are equal.

25. The method of claim 20, wherein said first new digital signal and second new digital signal are in frame alignment and payload alignment.

26. The method of claim 20, wherein said first digital signal and said second digital signal are a working copy and a protection copy, respectively, of an original digital signal.

27. The method of claim 20, wherein said first digital signal and said second digital signal are in a packet based format.

28. The method of claim 20, further comprising:
comparing said first PF pointer to said second PF pointer, generating a PF difference signal;
adding said PF difference signal to a base target offset signal to form said first target offset signal; and
comparing said first target offset signal to said first pointer offset signal to derive said first increment/decrement request signal.

29. The method of claim 20, further comprising:
communicating said first new digital signal and said second new digital signal to a switch; and
hitlessly switching between said first new digital signal and said second new digital signal.

30. A system for processing a digital signal, comprising:
a pointer follower to receive a first digital signal having a first signal frame, a first embedded payload and a pointer follower ("PF") pointer, extract said first embedded payload from said first digital signal and forward said first embedded payload;

an elastic buffer in electrical connection with said pointer follower operable to receive, delay and forward said first embedded payload;

a pointer generator to receive said first embedded payload and a synchronization pulse and construct a new digital signal comprising said first embedded payload, a new signal frame, and a pointer generator ("PG") pointer, wherein the location of said new signal frame within said new digital signal is determined according to said synchronization pulse;

a synchronization module to generate said synchronization pulse according to a predetermined schedule and communicate said synchronization pulse to said pointer generator;

a first comparator operable to compare the value of said PF pointer and the value of said PG pointer and generate a pointer offset signal; and a second comparator operable to compare said pointer offset signal to a target offset signal, generate an increment/decrement request signal based on the comparison, and communicate the increment/decrement request signal to said elastic buffer; and wherein said elastic buffer delays said embedded payload according to said increment/decrement signal.

* * * * *